(12) United States Patent
Howlett et al.

(10) Patent No.: US 7,908,052 B2
(45) Date of Patent: Mar. 15, 2011

(54) MAINTENANCE SYSTEM FOR AN EQUIPMENT SET

(75) Inventors: Peter Howlett, Orsay (FR); Francois Fournier, Roques S/Garonne (FR)

(73) Assignee: Thales, Paris (FR)

( * ) Notice: Subject to any disclaimer, the term of this patent is extended or adjusted under 35 U.S.C. 154(b) by 1858 days.

(21) Appl. No.: 10/089,089

(22) PCT Filed: Aug. 7, 2001

(86) PCT No.: PCT/FR01/02569
§ 371 (c)(1),
(2), (4) Date: May 19, 2005

(87) PCT Pub. No.: WO02/14972
PCT Pub. Date: Feb. 21, 2002

(65) Prior Publication Data
US 2006/0155425 A1    Jul. 13, 2006

(30) Foreign Application Priority Data

Aug. 11, 2000  (FR) ...................................... 00 10584

(51) Int. Cl.
*G06F 12/00* (2006.01)
(52) U.S. Cl. .................. 701/34; 340/945; 701/1; 701/29; 701/31; 701/33; 701/35; 370/242; 370/245
(58) Field of Classification Search .................. 340/500, 340/507, 510, 511, 514, 525, 945, 963, 971; 342/73.1, 158.1; 364/551.01, 579, 580, 900; 371/11, 15, 16, 20, 20.1, 24, 25, 27; 700/2, 700/81, 82; 701/3, 14, 29, 33, 1, 31, 34, 701/35; 702/91, 118, 120, 121, 188; 370/242, 370/245
See application file for complete search history.

(56) References Cited

U.S. PATENT DOCUMENTS

| 4,024,493 | A | * | 5/1977 | Ingels | 701/116 |
|---|---|---|---|---|---|
| 4,397,021 | A | * | 8/1983 | Lloyd et al. | 714/33 |
| 4,414,539 | A | * | 11/1983 | Armer | 340/500 |
| 4,590,550 | A | * | 5/1986 | Eilert et al. | 714/45 |
| 4,626,996 | A | * | 12/1986 | Arlott | 701/14 |
| 4,634,110 | A | * | 1/1987 | Julich et al. | 714/11 |

(Continued)

*Primary Examiner* — Khoi Tran
*Assistant Examiner* — Nikhil Sriraman
(74) *Attorney, Agent, or Firm* — Oblon, Spivak, McClelland, Maier & Neustadt, L.L.P.

(57) ABSTRACT

A rapidly installable and rapidly removable set of equipment (1-6, 11) which can be replaced by standard exchanges, furnished with individual electronic circuits for monitoring proper operation (1a-6a, 20a-23a, 30a-32a, 1 1a) assuming, at their level, a BITE function (Build [sic] In Test Equipment) for testing, for fault diagnosis and for issuing fault messages sent by data transmission to a central maintenance computer (7) itself formulating a report regarding the overall state of operation of the set of equipment. It relates more especially to the hardware parts of the electronic circuits for monitoring proper operation which are integral with the equipment (1-6) or with equipment parts (20-23, 30-32) and which are furnished with a nonvolatile memory (405) and by means of detection, selection and capture (403, 413, 423) into their nonvolatile memories (405), of the report formulated by the central maintenance computer (7). Since these hardware parts of circuits for monitoring proper operation track the tribulations of the equipment parts or pieces of equipment with which they are integral, they make it possible for the latest report regarding the overall state of operation of the set of equipment often causing the removal, to be always available, in a repair center, with an item removed for repair, thereby facilitating the drawing up of a repair diagnosis.

7 Claims, 2 Drawing Sheets

U.S. PATENT DOCUMENTS

| | | | |
|---|---|---|---|
| 4,658,359 A * | 4/1987 | Palatucci et al. | 701/14 |
| 4,675,675 A * | 6/1987 | Corwin et al. | 340/945 |
| 4,701,920 A * | 10/1987 | Resnick et al. | 714/733 |
| 4,926,363 A * | 5/1990 | Nix | 702/120 |
| 4,943,919 A | 7/1990 | Aslin et al. | |
| 5,036,479 A * | 7/1991 | Prednis et al. | 702/121 |
| 5,184,312 A * | 2/1993 | Ellis | 702/121 |
| 5,628,349 A * | 5/1997 | Diggins et al. | 141/3 |
| 5,638,383 A * | 6/1997 | Wotzak et al. | 714/733 |
| 6,269,319 B1 * | 7/2001 | Neisch et al. | 702/118 |
| 6,331,770 B1 * | 12/2001 | Sugamori | 324/158.1 |
| 6,457,145 B1 * | 9/2002 | Holmberg et al. | 714/45 |
| 6,965,816 B2 * | 11/2005 | Walker | 701/16 |
| 7,397,363 B2 * | 7/2008 | Joao | 340/539.11 |
| 2004/0117443 A1 * | 6/2004 | Barsness | 709/204 |
| 2008/0091309 A1 * | 4/2008 | Walker | 701/1 |

\* cited by examiner

MAINTENANCE SYSTEM FOR AN EQUIPMENT SET

BACKGROUND OF THE INVENTION

The present invention relates to the maintenance of a set of equipment, such as the set of avionic equipment of an aircraft which fulfill the various functions required for accomplishing a flight.

An aircraft comprises a large number of pieces of equipment, of diverse kinds, mechanical, hydraulic, electrical or electronic, whose proper operation is essential during a flight.

To improve the degree of confidence accorded to these pieces of equipment, a monitoring of their proper operation is carried out for each of them as often as possible, consisting of a monitoring of the fundamental parameters and within automatic or semiautomatic tests of proper operation, followed by a fault diagnosis which may lead to the issuing of fault messages. This monitoring of proper operation, associated with a piece of equipment, is known as the BITE function, stemming from the abbreviation for the expression "Built In Test Equipment".

The BITE function of a piece of equipment is assumed by a piece of electronics which may be specific or shared with other functions of the relevant piece of equipment. This piece of electronics performs the software processing required by the BITE function. It comprises a greater or lesser hardware part integral with the piece of equipment, with, as a minimum, in this hardware part, a nonvolatile memory in which are stored the violations of specification by the monitored parameters, the results of the tests, the fault diagnosis when it exists as well as the fault messages issued. The fault messages of the BITE functions of the monitored pieces of equipment of an aircraft are addressed, via an airplane data transmission link, to a centralizing piece of equipment placed on board the aircraft so as to gather the various fault messages issued.

On board recent aircraft, the fault messages originating from the BITE functions of the various pieces of equipment are consultable from the flight deck. They are furthermore preprocessed, with a view to easing the task of the crews and of the maintenance personnel, by a special-purpose central computer known by various titles such as CMC standing for the expression "Central Maintenance Computer" or else CFDIU standing for "Centralized Fault Display Interface Unit". This central maintenance computer is accessible to the crew via an interface with keyboard and screen which may be that known by the abbreviation MCDU stemming from the expression "Multipurpose Control Display Unit" but which may also be a portable computer of the PC type attached via a disconnectable data link which may or may not utilize the airplane bus. Its main function is to make, in real time or at the end of the flight, a diagnosis of the general situation of the aircraft on the basis of a summary of the fault messages received from the various pieces of equipment of the aircraft. It also fulfills other functions such as the correlating of the fault messages received with the alarms received at the flight deck level, the conducting of particular tests on the equipment, undertaken on request, by an operator intervening from the keyboard/screen interface affording access to the central maintenance computer or the compiling of a "post-flight" report, known by various titles such as PFR or LLR standing for "Post Flight Report" or "Last Leg Report", destined for the ground maintenance teams, encompassing a log of the fault messages issued by the various pieces of equipment of the aircraft and of the alarms presented to the crew as well as the summary of the fault messages made in the last resort and more generally, all the information about the states of operation of the equipment, capable of easing the work of the ground maintenance team, whether this information results from automatic exploitation of the equipment fault messages or from remarks by the crew.

To reduce the time for which an aircraft is grounded, its equipment, be it mechanical such as valves, pumps etc., electrical such as switches, relays, batteries etc., or electronic such as automatic pilot computers, navigation computers etc., is, as often as possible, designed in such a way as to be able to be easily dismantled and replaced rapidly by standard exchange. One then speaks of LRU equipment standing for the expression "Line Replaceable Unit".

The concept of items which can easily be dismantled and replaced by standard exchange is even extended to a lower tier of assemblage, within the pieces of equipment themselves, by use of modular architectures with modules which can easily be dismantled and replaced by standard exchange, some of them possibly being multifunction, that is to say usable in several different pieces of equipment. One then speaks of LRM modules standing for "Line Replaceable Module".

The BITE function for testing for proper operation exists at each of the two possible levels of standard exchange of items within an aircraft: LRU equipment level and LRM equipment module level. It is referred to as the resource BITE function when it is concerned with a hardware setup or with the first-level software used (such as the operating system) and as the application BITE function when it is concerned with higher-level software. It is ensured by a piece of electronics, of which a greater or lesser hardware part tracks the fate of the item capable of a standard exchange.

The BITE function can also exist at a third level of assemblage grouping together several LRM modules placed in one and the same cabinet or rack. It is then referred to as the overall BITE function and consists of a prediagnosis easing that of the central maintenance computer.

An exemplary system for maintenance of the equipment of an aircraft by means of BITE functions integrated into the equipment and of a central maintenance computer of the aforesaid kind is described in U.S. Pat. No. 4,943,919.

Once an equipment part or a piece of equipment has been tagged as defective and removed from an aircraft, it has to be overhauled in a repair station. To ease this overhauling, it is known practice for the nonvolatile memory of the hardware part of the electronics ensuring the BITE function of the removed item, which remains integral with the item even after its removal, to be made to play an overhaul help function. Specifically, this memory which can be consulted while the item is still installed on board the aircraft, by way of the MCDU screen/keyboard interface ensuring the interface with the central maintenance computer, is also consultable in the repair station by way of a test rig specially suited to this consultation function and used to diagnose the fault.

This overhaul help resulting from the storing in memory of the diagnosis of the BITE function of the item examined is sometimes insufficient, in particular in the case of faults occurring only in a particular context. The repair technician is then required to take account of the reasons for and conditions of removal. Hitherto, these reasons for and conditions of removal have appeared in a written note drafted by the operator managing the aircraft, usually an airline company, on the basis of the notes made by the ground maintenance personnel in the aircraft's maintenance logbook (Technical/Maintenance Logbook), from indications provided by the central maintenance computer, including the "post-flight" PFR/LLR report.

This entirely manual process for advising as to the reasons for and conditions of removal of an equipment part or of a piece of equipment involving several successive intervening parties often produces retranscription errors and exaggerated simplifications in the information transmitted to the repair station, or even a complete absence of information so that the help afforded to the fault diagnosis by the note accompanying the removed item and explaining the reasons for and conditions of removal is often less than that which one would be entitled to expect.

SUMMARY OF THE INVENTION

The aim of the present invention is to reduce the manual interventions in the process for advising a repair station as to the reasons for and conditions of removal of an equipment part or of a piece of equipment to be repaired by profiting from the presence, within the removed item, of a nonvolatile memory dedicated to the BITE function of this item, so as to make this nonvolatile memory play a role of storage, not only of the diagnosis of the BITE function of the removed item, but also of the "post-flight" PFR/LLR report drawn up by the central maintenance computer and, possibly, of the diagnoses of the BITE functions of other levels of assemblage encompassing that of the removed item: BITE function of the piece of equipment encompassing the removed item when the latter is an LRM module and when this piece of equipment is also furnished at its level with a BITE function, and/or an overall BITE function when the piece of equipment to which the removed item belongs is grouped together with other pieces of equipment in a cabinet or rack furnished at its level with an overall BITE function.

By virtue of this reducing of the manual interventions in the process for advising a repair station as to the reasons for and conditions of removal of an item to be repaired, the accuracy and the reliability of the information reaching the repair station, with the item removed, regarding the anomalies noted while operational and regarding the circumstances of the fault are improved. Numerous benefits may be expected from an improvement in the reliability and in the accuracy of the information given to the repair station, including:

- better quality of repair related to better knowledge of the circumstances of the fault,
- reduction in the repair time, likewise related to better knowledge of the circumstances of the fault,
- possibility of continuous improvement of items and equipment stemming from better knowledge of their anomalies noted while operational,
- possibility of prompting and training actions on the part of the maintenance personnel with regard to the operators managing the aircraft with a view to reducing the incorrect removals of items or of pieces of equipment following poor interpretation of the fault messages,
- better traceability of incorrect removals, referred to as NFF (the abbreviation standing for "No Fault Found").

The subject of the invention is a maintenance system for a set of equipment comprising:

- electronic circuits for monitoring proper operation of each piece of equipment, each furnished with means for formulating tests of proper operation and for issuing fault messages should the tests fail, as well as a nonvolatile memory integral with the monitored piece of equipment,
- a central maintenance computer allied with said electronic circuits for monitoring proper operation, provided with means of diagnosis of the state of operation of the set of equipment, functioning on the basis of the fault messages of said electronic circuits for monitoring proper operation and formulating a report regarding the overall state of operation of the set of equipment,
- one or more data transmission links linking said electronic circuits for monitoring proper operation to the central maintenance computer, said maintenance system for a set of equipment being characterized in that the central computer comprises means for making its report regarding the overall state of operation of the set of equipment available on the data transmission link or links linking it to the electronic circuits for monitoring proper operation and in that the electronic circuits for monitoring proper operation comprise means of detection, capture and transfer into their nonvolatile memories integral with the equipment, of the report regarding the overall state of operation of the set of equipment formulated by the central maintenance computer when this report travels over the transmission link or links linking the electronic circuits for monitoring proper operation to the central maintenance computer.

Advantageously, when pieces of equipment are grouped together in subsets themselves furnished, at their upper level of assemblage, with electronic circuits for monitoring proper operation generating fault messages relating to said subsets destined for the central maintenance computer, the electronic circuits for monitoring proper operation of these pieces of equipment are also furnished with means of detection, capture and transfer into their nonvolatile memories integral with the equipment, of fault messages issued by the electronic circuit or circuits for monitoring proper operation of the subset(s) to which the monitored pieces of equipment belong, when these messages travel over said data transmission link or links linking the circuits for monitoring proper operation to the central maintenance computer.

Advantageously, when, pieces of equipment comprise parts themselves furnished, at their lower level of assemblage, with electronic circuits for monitoring proper operation generating fault messages relating to said equipment parts destined for the central maintenance computer, characterized in that the electronic circuits for monitoring proper operation of these equipment parts are also furnished with means of detection, capture and transfer into their nonvolatile memories integral with the equipment parts, of fault messages issued by the circuit or circuits for monitoring proper operation of the piece or pieces of equipment to which the monitored equipment parts belong when these messages travel over the data transmission link or links linking the circuits for monitoring proper operation to the central maintenance computer.

Advantageously, when pieces of equipment comprise parts themselves furnished, at their lower level of assemblage, with electronic circuits for monitoring proper operation generating fault messages relating to said equipment parts destined for the central maintenance computer, and when the pieces of equipment which comprise these equipment parts are grouped together in subsets themselves furnished, at their upper level of assemblage, with electronic circuits for monitoring proper operation generating fault messages relating to said subsets destined for the central maintenance computer, the electronic circuits for monitoring proper operation of the parts of these pieces of equipment are also furnished with means of detection, capture and transfer into their nonvolatile memories integral with the equipment parts, of fault messages issued by the circuit or circuits for monitoring proper operation of the piece or pieces of equipment and of the subgroup(s) of equipment to which the equipment parts which they are monitoring belong, when these messages travel over the data transmission link or links linking the circuits for monitoring proper operation to the central maintenance computer.

Advantageously, when pieces of equipment comprise parts themselves furnished, at their lower level of assemblage, with electronic circuits for monitoring proper operation generating fault messages relating to said equipment parts destined for the central maintenance computer, the electronic circuits for monitoring proper operation of these pieces of equipment are also furnished with means of detection, capture and transfer into their nonvolatile memories integral with the equipment, of fault messages issued at the lower levels of assemblage by the circuit or circuits for monitoring proper operation of the equipment parts of which they are composed when these messages travel over the data transmission link or links linking the circuits for monitoring proper operation to the central maintenance computer.

BRIEF DESCRIPTION OF THE DRAWINGS

Other characteristics and advantages of the invention will emerge from the description hereinbelow of an embodiment given by way of example. This description will be given in conjunction with the drawing in which.

DETAILED DESCRIPTION

The main pieces of equipment of a modern aircraft contributing the accomplishment of the flight, such as the engines, the motors actuating the rudder and elevators as well as the various flaps, the landing gear, etc., the interfaces for controlling these various engines and motors, the measurement apparatus for the aerodynamic parameters, for the heading, for the altitude, for position, for velocity, the automatic pilot, the flight management computer, the fuel management computer, the radio communication apparatus, etc. are furnished with individual devices for monitoring proper operation carrying out a BITE function, that is to say the checking of the main operating parameters of this apparatus as well as the conducting of automatic or semiautomatic tests when necessary and the issuing of fault messages when the measured parameters depart from the permitted value ranges or when the results of a test are not as expected.

The diversity of the possible fault messages as well as of the possibilities of propagation of the initial fault from one piece of equipment to other dependent pieces of equipment makes it difficult for the crew or the maintenance personnel to draw up in real time and in all possible situations a diagnosis of the general state of the aircraft. This is why modern aircraft are equipped with a central maintenance computer responsible for the most thorough possible automatic processing of the fault messages so as to inform the crew or the maintenance personnel only of the actual fault or faults and provide them with indications regarding the conduct to be taken in order to alleviate the consequences of these faults.

To ease the maintenance of an aircraft and reduce the time periods for which it is grounded, there are ever greater endeavors to generalize the standard exchange, both at the level of certain items of equipment, and at the level of certain complete pieces of equipment. These easily dismantleable items of equipment or pieces of equipment are then furnished, at their respective levels of assemblage, with individual electronic circuits for monitoring proper operation ensuring a BITE function for checking the main parameters, for formulating automatic and semiautomatic tests of proper operation, and for fault diagnosis, and issuing, when necessary, fault messages destined for the central maintenance computer so that the latter can draw up its diagnosis regarding the general state of the aircraft and pinpoint the defective item of equipment or piece of equipment.

Figure 1:
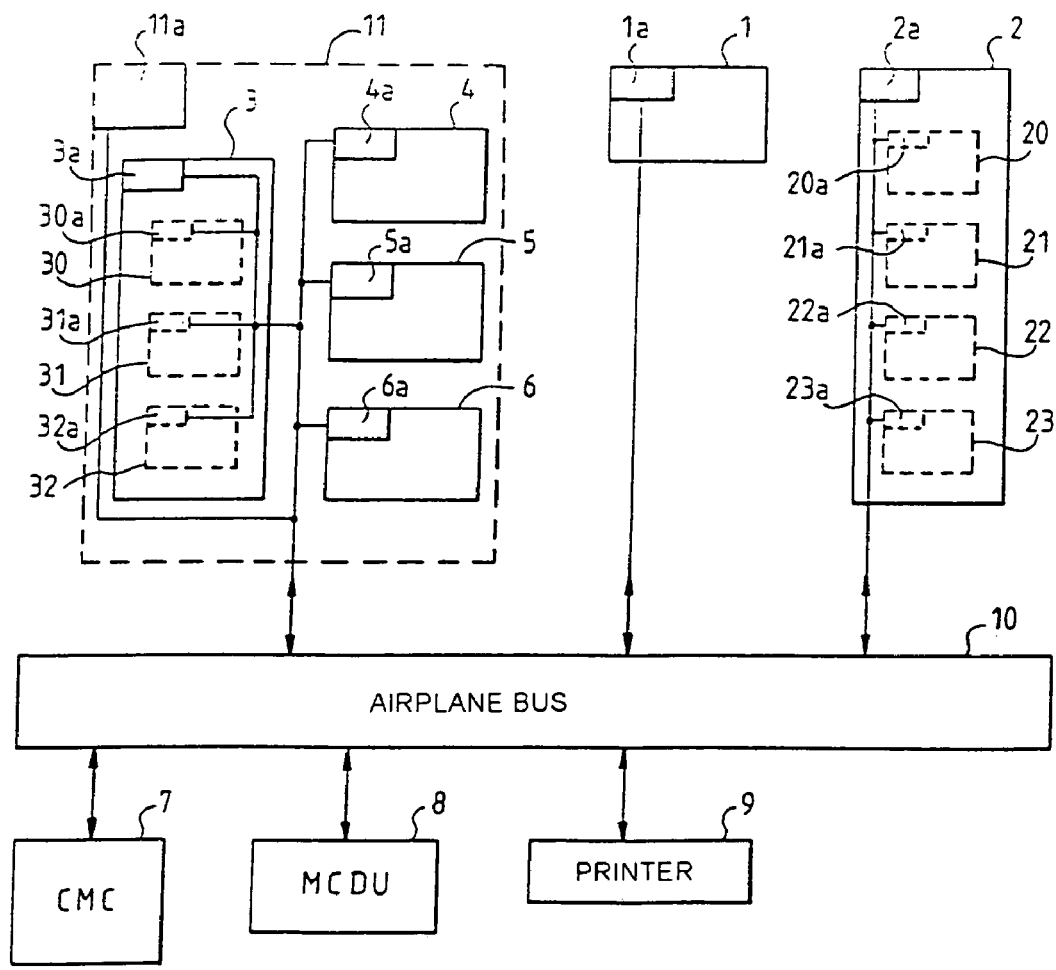
FIG. 1 represents, diagrammatically, an exemplary architecture of a centralized maintenance system for equipment of an aircraft, and FIG. 2 details an exemplary electronic circuit for monitoring proper operation according to the invention, intended to be mounted on a removable item of equipment or piece of equipment whose proper operation is monitored by means of a centralized maintenance system such as that of FIG. 1.

FIG. 1 shows, diagrammatically, a centralized architecture of a maintenance system as may be found in a modern aircraft. Depicted therein is a set of equipment 1 to 6 geographically dispersed within the airframe and linked to one another and to a central maintenance computer CMC 7, to a keyboard/screen interface MCDU 8 and to a printer 9, by way of an airplane data transmission link 10.

All the pieces of equipment 1 to 6 are furnished with individual electronic circuits for monitoring proper operation assuming a BITE function at their levels. These individual electronic circuits for monitoring proper operation have a hardware part 1a, 2a, 3a, 4a, 5a, 6a integral with the monitored piece of equipment and communicate their fault messages to the central maintenance computer CMC 7 by way of the airplane data transmission link 10.

Certain pieces of equipment, such as the pieces of equipment 1, 4, 5, 6 are indivisible and comprise, individually, only one electronic circuit for monitoring proper operation ensuring a BITE function at the overall level of the piece of equipment itself. This electronic circuit for monitoring proper operation comprises a hardware part 1a, 4a, 5a, 6a integral with the monitored piece of equipment.

Other pieces of equipment, such as the pieces of equipment 2, 3, are designed according to a modular architecture and enclose various modules 20, 21, 22, 23 or 30, 31, 32 which can be easily dismantled and replaced by standard exchange. These pieces of equipment 2, 3, are then each furnished with an electronic circuit for monitoring proper operation ensuring a BITE function at the overall level of the piece of equipment, and with a set of electronic circuits for monitoring proper operation individually ensuring a BITE function at the level of their modules. The electronic circuits for monitoring proper operation functioning at the overall level of a piece of equipment have a hardware part 2a, 3a integral with the piece of equipment or with one of its modules when the piece of equipment is organized in modules, while the electronic circuits for monitoring proper operation functioning at the level of the modules 20, 21, 22, 23, 30, 31, 32 each comprise a hardware part 20a, 21a, 22a, 23a, or 30a, 31a, 32a integral with the monitored module.

Certain finally of the pieces of equipment 1, 2 are geographically isolated while others 3, 4, 5, 6 are grouped together in cabinets or racks 11, themselves individually equipped with an electronic circuit for monitoring proper operation, with a hardware part 11a, assuming a BITE function at the level of the equipment grouping, integral with the cabinets or racks or even with one of the pieces of equipment or with one of the equipment modules of the grouping.

The set of hardware parts of the electronic circuits for monitoring proper operation, integral with equipment modules such as the parts 20a, 21a, 22a, 23a, or 30a, 31a, 32a, with pieces of equipment such as the parts 1a, 2a, 3a, 4a, 5a, 6a, or with groupings of equipment in a cabinet or rack, such as the part 11a, are connected to the airplane data transmission link 10 which may for example be a bus of ARINC 429, 629 or Ethernet type to which are also connected the central maintenance computer 7, the keyboard/screen interface MCDU 8 and a printer 9.

The central maintenance computer 7, the makeup of which is well known to the person skilled in the art and an example of which is described in U.S. Pat. No. 4,943,919, performs, in real time or at the end of the flight, a diagnosis of the general state of the aircraft, pinpoints the defective piece or pieces of equipment from which the fault messages originated, the latter reaching it from the various BITE functions assumed by the electronic circuits for monitoring proper operation distributed over equipment modules, pieces of equipment and groupings of equipment of the aircraft, informs the crew or the maintenance personnel, of the piece or pieces of equipment which are actually defective, saves in a nonvolatile part of its memory, a log of the fault messages received, of the alarms issued destined for the crew and draws up, destined for the team ensuring the ground maintenance of the aircraft, a "post-flight" PFR/LLR report which comprises a summary of the fault messages, alarms and information of a general context (date, time, flight phase, etc.) useful for the interpretation of this information. This "post-flight" PFR/LLR report available just after landing can be printed by means of the printer 9 installed on board the aircraft, automatically at the end of each flight or when asked for by an operator requesting same from the keyboard/screen interface MCDU 8 placed in the flight deck of the aircraft. It may also be sent to a fleet management center belonging for example to the operator of the aircraft, by way of an airborne external telecommunication network such as the ACARS network, the abbreviation standing for "Aircraft Communication Addressing and Reporting System", using a transmission link of VHF, UHF or other type.

The keyboard/screen interface MCDU 8, which allows an exchange of commands and of information between an operator and the central maintenance computer 7, is the interface used moreover, and this is its main function, to allow the crew to exchange orders and information with the automatic pilot AP, the flight management computer FMS (Flight Management System) and the fuel management computer. The functions of automatic pilot, flight management, fuel management and centralized maintenance may be assumed by one and the same computer or by several different computers often grouped together in one and the same cabinet or rack. This keyboard/screen interface MCDU 8 can, as far as dialog with the central maintenance computer 7 is concerned, be twinned or replaced by a portable computer of the PC kind attached to the central maintenance computer 7 by a disconnectable data link which may or may not utilize the airplane data transmission bus 10.

The printer 9 is placed in the flight deck at an easily accessible location and is linked, by the airplane data transmission bus 10, to various pieces of equipment, including the central maintenance computer 7.

When it has carried out a standard exchange of an equipment module or of a complete piece of equipment pursuant to the indications contained in the "post-flight" PFR/LLR report delivered by the central maintenance computer 7, which indications may possibly be specified by additional operating tests programmed from the screen/keyboard interface MCDU 8, the aircraft's ground maintenance team sends the removed item: module or complete piece of equipment, to a repair station for overhaul with an accompanying note explaining the reasons for the removal. Having arrived at the repair station, the removed item is subjected to tests so as to draw up a repair diagnosis, repaired and checked before being declared fit for service once again. In a certain number of cases, the repair diagnosis turns out to be difficult to draw up.

To help the repair diagnosis of an item furnished with an electronic circuit for monitoring proper operation, thought has been given to harnessing the log of the fault messages formulated during the item's commissioning period preceding its removal, by making provision to equip the hardware part of the electronic circuit for monitoring proper operation, which remains integral with the item, with a nonvolatile memory, that is to say one which retains the data stored should the power supply be disabled, in which this log of the fault messages is stored. Thus, it is possible, upon the arrival of this item at the repair station, to consult the log of the fault messages which is stored in the nonvolatile memory of the hardware part of the electronic circuit integral therewith, thereby facilitating repair diagnosis.

However, in a certain number of cases, help from the log of the fault messages of the BITE function associated with the item undergoing repair diagnosis is not sufficient to arrive at a safe diagnosis. Hence, only the explanatory removal note accompanying the item then remains as diagnostic aid. However, this note, the drafting of which results from an entirely manual process involving several intervening parties, often comprises retranscription errors and exaggerated simplifications of the grounds for and circumstances of the removal, or even sometimes a complete absence of these grounds.

Since the motivation for the removal of an item by the aircraft's ground maintenance team results in the great majority of cases from the consulting of the "post-flight" PFR/LLR report drawn up by the central maintenance computer, it is proposed that not only the log of the fault messages generated by the BITE function of the item but also the latest "post-flight" PFR/LLR report or reports drawn up by the central maintenance computer be stored in the nonvolatile memory of the hardware part, integral with the item, of the electronic circuit for monitoring proper operation ensuring the BITE function of the item.

This "post-flight" PFR/LLR report storage operation is made easier by the fact that a "post-flight" PFR/LLR report is often available, at one moment or another on the airplane data transmission link. Thus, in the exemplary configuration of the system for centralized monitoring illustrated in the above figure, the "post-flight" PFR/LLR reports necessarily utilize the airplane data transmission link 10 for their printing since the printer 9 is connected by the latter to the central maintenance computer 7. Under these conditions, it is sufficient to furnish the various electronic circuits ensuring BITE functions, with means for detecting the presence of a "post-flight" PFR/LLR report on the airplane data transmission link, and for capturing and for transferring this "post-flight" PFR/LLR report into their nonvolatile memories integral with the items liable to be removed. Even if the printer 9 is connected to the central maintenance computer 7 by a specific link, these means may be effective since the "post-flight" PFR/LLR reports utilize the airplane transmission link 10 on other occasions, in particular for their consultation via the keyboard/screen interface 8 or for their transmission to the ground by way of an airborne external telecommunication network. It is also possible to envision by a suitable programming of the central maintenance computer 7, a specific operation for making its "post-flight" PFR/LLR report available on the airplane data transmission link 10 executed at the end of each flight or upon the intervention of an operator.

It is also proposed, more generally, that not only the log of their fault messages and the "post-flight" PFR/LLR report but also the logs of the fault messages of the BITE functions associated with higher levels of assemblage, that is to say of the piece or pieces of equipment to which a module belong [sic] when the item in question is a module, or of the possible grouping of equipment to which a piece of equipment belongs when the item in question is a piece of equipment or one of its modules, be stored in the nonvolatile memories of the hardware parts, which remain integral with the removed items, of the electronic circuits for monitoring proper operation ensuring the BITE functions. Thus, a fairly complete summary of the in-situ behavior of the item which led the aircraft's ground maintenance team to replace it will be available at the repair station. As earlier in respect of the "post-flight" PFR/LLR report, the operation is made easier by the fact that the fault messages generated by the electronic circuits for monitoring proper operation assuming the BITE functions are often available at one moment or another on the airplane data transmission link 10. If such is not the case, the BITE functions of the higher levels of assemblage being linked to the central maintenance computer 7 by a specific data transmission link, it is sufficient to have these BITE functions of higher level of assemblage make available, by means of suitable programming, the log of their fault messages on the airplane data transmission bus, at the end of each flight or upon the intervention of an operator.

It is even proposed that in addition to the latest "post-flight" PFR/LLR report or reports, the logs of the fault messages of the BITE functions associated with lower levels of assemblage be stored in the nonvolatile memories of the hardware parts, which remain integral with the removed items, of the electronic circuits for monitoring proper operation ensuring the BITE functions, the electronic circuit for monitoring proper operation ensuring the BITE function of a piece of equipment storing in the nonvolatile memory of its hardware part remaining integral with the removed item, the logs of the fault messages of the BITE functions associated with its modules, these logs being able to aid the tagging of a fault caused by the defectiveness of an internal element of the removed item, which element is itself furnished with a BITE function.

Figure 2:
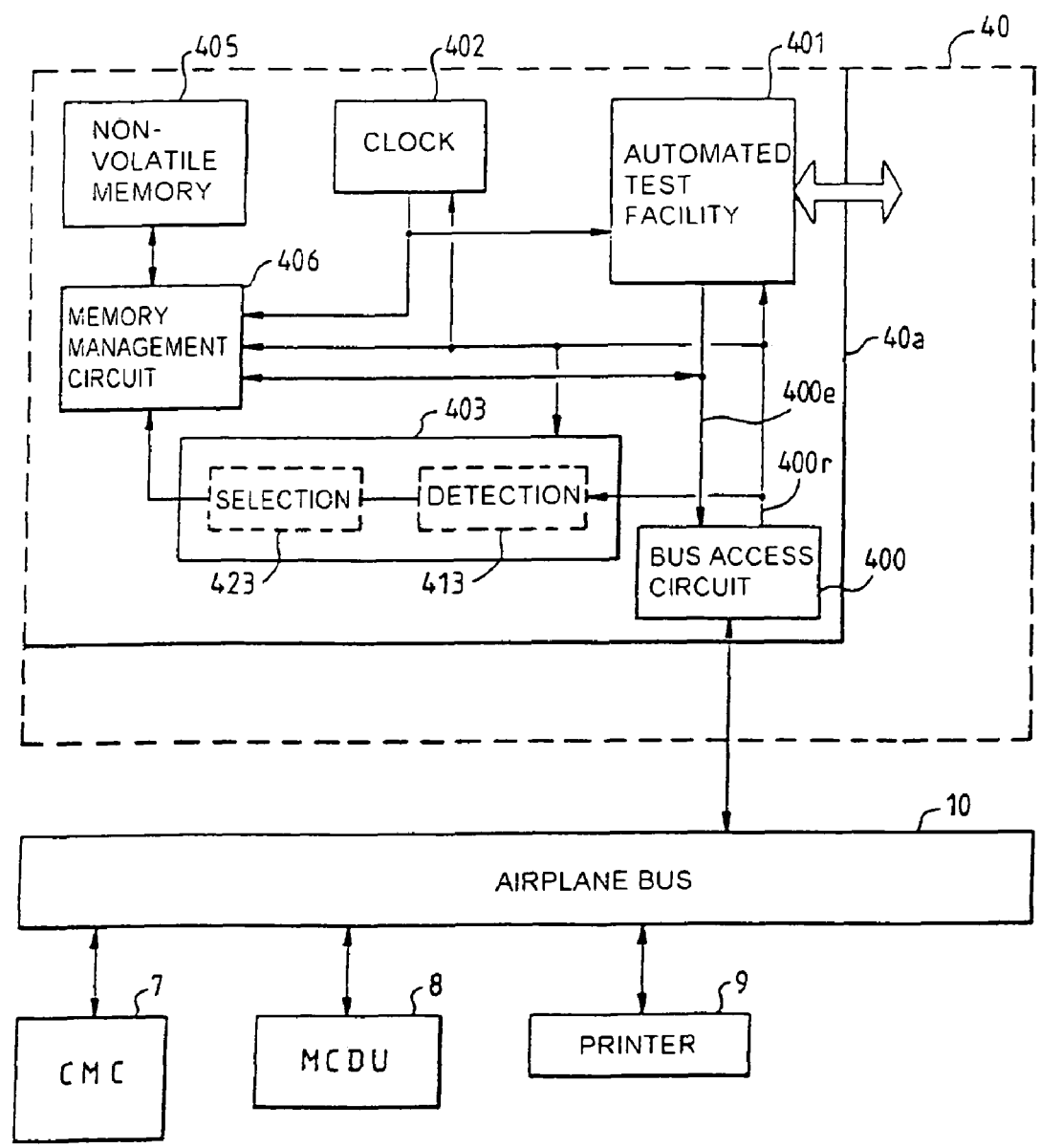

FIG. 2 gives one possible exemplary configuration of the hardware part, which remains integral with the removed item, of an electronic circuit for monitoring proper operation 40a assuming a BITE function, allowing local storage, at its level, not only of the log of the BITE function of the item but also of the "post-flight" PFR/LLR report of the central maintenance computer and optionally, of logs of other BITE functions assumed by other electronic circuits of proper operation.

This hardware part of an electronic circuit for monitoring proper operation 40a is integral with an item 40 whose tribulations during installation and removal it tracks and which may, as was envisioned earlier, be an equipment module (20, 21, 22, 23, 30, 31, 32 FIG. 1) or a piece of equipment (1, 2, 3, 4, FIG. 1). It comprises a circuit 400 for bidirectional access to the bus of the airplane data transmission link 10, an automated test facility 401, a clock 402, a circuit for 403 for detection, capture and transfer of the messages traveling over the bus of the airplane data transmission link 10 with a first stage for detecting messages 413 and a second stage for selecting messages 423, a nonvolatile memory 405 and a nonvolatile memory management circuit 406.

The circuit 400 for bidirectional access to the bus of the airplane data transmission link 10 is a special-purpose circuit which is found in any piece of equipment attached to a bus of the airplane data transmission link 10. It constitutes the interface between a piece of equipment and the bus of the airplane data transmission link, that is to say on the one hand, the transition, in both directions, between a data organization suited to a piece of equipment and a data organization suited to the airplane data transmission link and, on the other hand, the switch, in both directions, from a signal conveying the data having the physical characteristics suited to a piece of equipment, to a signal conveying the data having the physical characteristics suited to the bus of the transmission link. It will not be detailed since it does not constitute part of the invention. It is sufficient to know that it serves as interface for the bus of the data transmission link for which it provides locally, at the level of a piece of equipment, access 400e on transmission and access 400r on reception.

The automated test facility 401 is connected to elements, sensors, actuators, etc. dispersed within the item 40, to the transmission access 400e and reception access 400r of the circuit 400 for access to the airplane data transmission bus 10, to the clock circuit 402 and to the memory management circuit 406. It assumes the BITE function of the item 40. Its connections to sensors and actuators dispersed within the item 40 allow it to monitor operating parameters of the item 40 and also to perform tests of proper operation on this item. Its connection to the clock circuit 402 allows it to datestamp its messages and also to undertake tests or measurements with fixed periodicities or dates. Its connections to the transmission access 400e and reception access 400r of the circuit 400 for bidirectional access to the airplane data transmission bus 10 allow it to communicate with the central maintenance computer 7 for its parametrization, the conducting of tests of proper operation and the transmitting of the fault messages. Its design will not be detailed since it does not constitute part of the invention and it is furthermore highly dependent on the nature of the item 40 whose operation is monitored.

The clock circuit 402 can be reset to time from the central maintenance computer 7 by virtue of a branchoff from the reception access 400r of the circuit 400 for bidirectional access to the bus of the airplane data transmission link 10. It delivers a time reference to the various elements of the circuit for monitoring proper operation 40a.

The nonvolatile memory 405 is, for example, an electrically erasable read-only memory or so-called EEPROM (Electrically Erasable/Programmable Read-Only Memory).

The memory management circuit 406 which is associated with the nonvolatile memory 405 makes it possible, for example, given the limited capacity of the latter, to use it as a register of first-in first-out type known by the acronym FIFO in such a way that the most recent part of the log is always in memory. It receives the fault messages issued by the automated test facility 401 traveling over the transmission access 400e of the circuit 400 for bidirectional access to the bus of the airplane data transmission link 10 as well as the "post-flight" PFR/LLR reports of the central maintenance computer 7 and the fault messages of other circuits for monitoring proper operation assuming BITE functions, available as output from the circuit 423 for selecting messages and datestamps them before entering them into the nonvolatile memory 405. Like the automated test facility 401 and the clock circuit 402, it has a control input connected to the reception access 400r of the circuit 400 for bidirectional access to the bus of the airplane data transmission link 10 which makes it possible to control it remotely by way of this bidirectional access circuit 400.

The first detection stage 413 of the circuit [lacuna] detection, capture and transfer of messages 403 which is connected to the reception access 400r of the circuit 400 for bidirectional access to the bus of the airplane data transmission link 10 isolates each message traveling over the bus of the airplane transmission link while the second stage 423 of the detection, capture and transfer circuit 403 analyzes the labels of the messages traveling over the airplane transmission link 10 which are made available to it by the first stage for detecting messages 413 so as to retain only those issued by the central maintenance computer 7 and belonging to a "post-flight" PFR/LLR report, and the fault messages originating from certain electronic circuits for monitoring proper operation assuming BITE functions, duly referenced at the level of the hardware part 40a of an electronic circuit for monitoring proper operation. Like the automated test facility 401, the clock circuit 402 and the memory management circuit 406, it comprises a control input connected to the reception access 400r of the circuit 400 for bidirectional access to the bus of the airplane data transmission link 10 which makes it possible to control it remotely by way of this bidirectional access circuit 400, so as in particular to provide it with the identities of the electronic circuits for monitoring proper operation assuming BITE functions, whose messages it must capture.

To facilitate understanding, the hardware part, represented in FIG. 2, of the electronic circuit for monitoring proper operation is itself sufficient for carrying out a complete BITE function. There are however cases where it is more advantageous to simplify this hardware part to the point at which it can now assume, by itself, only part of a BITE function, the responsibility for the remaining part of the BITE function being off-loaded onto the central maintenance computer or onto a prediagnosis computer.

Likewise, with the aim of facilitating comprehension, the hardware part of an electronic circuit for monitoring proper operation has been represented in FIG. 2, in the form of an assemblage of separate boxes dedicated to distinct functions. It should nonetheless not be concluded that this assemblage implies that such boxes necessarily exist in an embodiment, it being possible for the functions carried out by different boxes to be so by means of one or more microprocessors driven by software and operating in multitask mode.

The electronic circuits for monitoring proper operation which have just been proposed for assuming the BITE function of an equipment part or of a piece of equipment which can be dismantled, capable of standard exchanges, within a maintenance system with a centralized computer, allow a repair station to obtain, from the removed item itself, a sufficiently complete overview of the progress of the latest campaign of use of the item so as to:

note the conditions under which the fault motivating the removal of the item was declared (concomitance of faults with other pieces of equipment or equipment parts, possible disturbances of the electrical or hydraulic networks, etc.), assess whether the removal of the item did indeed follow an announcement incriminating the item concerned.

The invention claimed is:

1. A maintenance system comprising:
    a plurality of equipment units each associated with a monitoring unit, the monitoring unit being configured to monitor the respective equipment unit, the monitoring unit including,
        a test unit configured
            to test proper operation of each equipment unit and
            to issue fault messages when testing indicates a failure of the respective equipment unit, and
        a non-volatile memory unit configured to store at least the fault messages;
    a central maintenance unit configured to communicate with test units of the plurality of equipment units, the central maintenance unit including a diagnosis unit configured
        to check a state of the plurality of equipment units by using the fault messages, and
        to generate a report on an overall state of operation of the maintenance system; and
    a data transmission link configured to provide a data connection between the plurality of equipment units and the central maintenance unit,
    wherein
        the central maintenance unit makes the report available on the data transmission link, and
        each of the plurality of equipment units include a detection circuit configured
            to detect and capture the report from the data transmission link, and
            to transfer the report from the data transmission link into a respective non-volatile memory unit after the report is available on the data transmission link.

2. The maintenance system according to claim 1, further comprising:
    a subset of equipment units grouping at least some of the plurality of equipment units into a group of equipment units, the subset including,
        a group test unit connected to the data transmission link and configured
            to test proper operation of the equipment units of the group and
            to issue group fault messages when testing indicates a failure of at least one equipment unit of the group, and
            to make the group fault messages available on the data transmission link, and
        a non-volatile memory unit configured to store at least the group fault messages,
    wherein
        the detection circuit of the equipment units of the group detects and captures group fault messages, and
            transfers the group fault messages into respective non-volatile memory units when the group fault messages are available on the data transmission link, and
        the central maintenance unit takes the group fault messages into account when making the report.

3. The maintenance system according to claim 2, wherein the detection circuit
    analyzes labels of messages that are transmitted over the data transmission link, and
    isolates the group fault messages and the report found by analyzing the labels of the messages.

4. The maintenance system according to claim 1, further comprising:
    a user interface linked to the central maintenance unit by the data transmission link and configured to display the report to a user.

5. The maintenance system according to claim 1, wherein the report is a post flight report that includes a log of all the fault messages received by the central maintenance unit during a flight of an aircraft.

6. The maintenance system according to claim 5, further comprising:
    an airborne external communications network connected to the maintenance system and configured to send the report to a fleet management center.

7. The maintenance system according to claim 1, wherein the central maintenance unit submits the report when receiving an instruction after a flight.

* * * * *